(12) United States Patent
Hong et al.

(10) Patent No.: US 6,728,075 B2
(45) Date of Patent: Apr. 27, 2004

(54) ACTUATOR LATCH FOR HARD DISK DRIVE

(75) Inventors: Min-Pyo Hong, Gyeonggi-do (KR); Sung-Hoon Choa, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 09/966,995

(22) Filed: Oct. 1, 2001

(65) Prior Publication Data

US 2002/0141116 A1 Oct. 3, 2002

(30) Foreign Application Priority Data

Mar. 30, 2001 (KR) .................................... 2001-16868

(51) Int. Cl.[7] .................................................. G11B 5/54
(52) U.S. Cl. .................................................. 360/256.4
(58) Field of Search ...................................... 360/256.4

(56) References Cited

U.S. PATENT DOCUMENTS 6,529,349 B1 * 3/2003 Byun et al. .............. 360/256.4

* cited by examiner

Primary Examiner—Robert S. Tupper
(74) Attorney, Agent, or Firm—Staas & Halsey LLP

(57) ABSTRACT

In an actuator latch used with a hard disk drive to lock an actuator in a non-pivoting position when a magnetic head installed at the actuator is positioned in a parking zone of a hard disk, the actuator latch includes a hooked portion provided at one side of the actuator and having first and second hook steps disposed to face each other, a locking member having a hook portion which is coupled to the hooked portion as the actuator moves to the parking zone, the hook portion coupled to the hooked portion being interfered with the first hook step when the actuator rotate clockwise and with the second hook step when the actuator rotate counterclockwise, and an elastic member elastically supporting the locking member to be capable of rotating and providing a restoring force to the locking member with respect to both clockwise and counterclockwise rotations of the locking member. Thus, when a clockwise or counter-clockwise rotational impact is applied to the hard disk drive, the actuator latch restricts rotation of the actuator so that the actuator cannot escape from the parking zone and the hard disk drive can be protected from being damaged.

23 Claims, 10 Drawing Sheets

ACTUATOR LATCH FOR HARD DISK DRIVE

CROSS-REFERENCE TO RELATED APPLICATIONS

This application claims the benefit of Korean Patent Application No. 2001-16868 filed on Mar. 30, 2001, in the Korean Industrial Property Office, the disclosure of which is incorporated herein by reference.

BACKGROUND OF THE INVENTION

1. Field of the Invention

The present invention relates to a hard disk drive, and more particularly, to an actuator latch used with a hard disk drive which fixes an actuator of the hard disk drive in a parking zone when the actuator does not operate.

2. Description of the Related Art

In general, a hard disk as one of auxiliary memory devices in a computer records data on a hard disk or reproduces data from the hard disk. An actuator having a magnet head functioning as an electromagnet is installed in the hard disk drive.

When the hard disk drive is actuated, the actuator rotates so that the magnetic head moves from the parking zone to a data zone. The magnetic head of the actuator writes data on the hard disk or reads data that is stored magnetically on the hard disk.

When the electric power is turned off to end the use of a computer, a driving voltage to a spindle motor also stops so that the speed of the hard disk rotated by the spindle motor gradually decreases. At this point, the magnetic head in the state of flying above the hard disk by the flow of air descends onto the surface of the hard disk. However, when the magnetic head lands on the surface of the data zone of the hard disk, the magnetic surface of the hard disk or data recorded on the hard disk may be damaged. To prevent the above problem, a parking zone is provided on the surface of the hard disk. Here, the parking zone is a portion of the surface of the hard disk where no data is recorded. The magnetic head is moved to the parking zone by a program before it lands on the surface of the hard disk.

When external impacts or vibrations are applied to the hard disk drive in an operation ready mode, the magnetic head, staying in the parking zone, is forced to be moved to a data zone while contacting the hard disk. The magnetic head intruding on the data zone damages the surface of the hard disk as well as the data stored in the hard disk by contacting the surface of the hard disk.

Thus, to prevent the above problem, an actuator latch for firmly fixing the magnetic head during external impacts or vibrations by supporting the magnetic head in the parking zone with a particular force, is used.

FIG. 1 shows a conventional hard disk drive that is disclosed in U.S. Pat. No. 5,636,090. Referring to FIG. 1, the conventional hard disk drive 100 includes a hard disk 120 rotatably installed at a housing 110 and having a data zone 121 where data is recorded and a parking zone 122 where no data is recorded, an actuator 130 transferring the magnetic head 131 that reads and writes information with respect to the hard disk 120 to a desired track position of the hard disk 120, and a latch device 180 preventing the actuator 130 positioned in the parking zone 122 from escaping therefrom.

The magnetic head 131 is installed at one end of the actuator 130, and a bobbin portion 134, around which a coil 133 is wound to generate a magnetic field, is installed at the other end of the actuator 130. The actuator 130 is installed to be capable of pivoting around a pivot shaft 136 installed at the housing 110. The bobbin portion 134 moves the actuator 130 to a desired track of the hard disk 120 by an electromagnetic force generated between a stator 140 and a yoke 150 installed at the housing 110.

The latch device 180 is installed to be capable of pivoting around a rotation shaft 161 installed at the housing 110, and includes a locking member 160 and a spring 170. In the locking member 160, a latch hole 163 is provided at one end of the locking member 160 to latch a finger portion 139 that is provided at one side of the bobbin portion 134 and an inertia member 162 is provided at the other end thereof. The spring 170 is connected to the locking member 160 and provides an elastic force.

In the above structure, when the actuator 130 moves above the hard disk 120 and/or there is no external impact, including rotational impact, the finger portion 139 is elastically biased by the spring 170. Thus, since the actuator 130 is not firmly held by the latch hole 163, the actuator 130 moves to the data zone 121 from the parking zone 122 and reads or records data with respect to the hard disk 120.

When the actuator 130 is positioned in the parking zone 122 and the hard disk 120 receives a clockwise rotational impact externally with respect to the drawing, the actuator 130 rotates counterclockwise due to a rotational inertial force. Also, the locking member 160, reacting more sensitively than the actuator 130, rotates counterclockwise so that the finger portion 139 is inserted in the latch hold 163 and firmly held therein. Thus, the actuator 130 is prevented from escaping from the parking zone 122.

However, when a counterclockwise rotational impact with respect to the drawing is applied to the hard disk 120, the actuator 130 rotates clockwise due to a rotational inertial force, and the locking member 160 also rotates clockwise. Thus, the finger portion 139 is not firmly held by the latch hole 163.

FIG. 2 shows a conventional load-unload hard disk drive having a ramp. Referring to FIG. 2, the hard disk drive 200 includes a hard disk 220, an actuator 230, and an actuator latch 280. The hard disk 220 is divided into a data zone 222 where data is recorded and a parking zone 221 where no data is recorded.

The actuator 230 is installed to be capable of pivoting at a pivot shaft 235, which is installed at a housing 210. A magnetic head 231 is provided at one end of the actuator 230 and a bobbin portion 234, around which a coil 233 is wound, is provided at the other end thereof. The bobbin portion 234 generates an electromagnetic force between the bobbin portion 234 and a stator 250 installed at the housing 210 so that the actuator 230 can be positioned at a desired track of the hard disk 220. A finger portion 237, to be caught by a hook portion 261 of a locking member 260, is provided at one side of the bobbin portion 234. A magnetic portion 236, corresponding to a magnet match 240 installed at the stator 250, is provided at the other side of the bobbin portion 234.

A ramp 290 is installed at the housing 210 close to the hard disk 220. The magnetic head 231 is accommodated on the ramp 290 when the actuator 230 is parked.

The actuator latch 280 includes the locking member 260 having the hook portion 261 at one end thereof and a spring 270 connected at the other end thereof and is installed to be capable of pivoting by being inserted in a rotation shaft 263 installed at the housing 210. The spring 270 provides an elastic force on the locking member 260, and the finger portion 237 is provided at the bobbin portion 234 to engage with the hook portion 261.

In the above structure, when there is no external impact, or in a normal operation, the hook portion 263 of the actuator latch 280 does not hold the finger portion 237. Here, the actuator 230, overcoming a force between the magnet latch 240 and the magnet portion 236, moves over the data zone 222 of the hard disk 220 to record data or reproduce recorded data.

When there is a relatively weak external impact with respect to a force acting between the magnet latch 240 and the magnet portion 236, the actuator 230 is prevented from escaping from the parking zone 221 by the force acting between the magnet latch 240 and the magnet portion 236. However, when there is a relatively strong clockwise external rotational impact with respect to the force acting between the magnet latch 240 and the magnet portion 236, a clockwise rotational impact with respect to the drawing applies to the hard disk 220. Here, the actuator 230 rotates counterclockwise and may escape from the parking zone 221. Also, the locking member 260 rotates counterclockwise by a rotational inertial force and the hook portion 261 is engaged with the finger portion 237. Thus, the actuator 230 is prevented from escaping from the parking zone 221.

When the external impact disappears, the locking member 260 returns to its original position by an elastic restoring force and the finger portion 237 is released from being held by the hook portion 261.

In the above structure, when the hard disk drive 200 receives a relatively strong clockwise external rotational impact, the actuator 230 receives a counterclockwise rotational inertial force. However, the actuator latch 280 receives a counterclockwise rotational inertial force, and reacts more sensitively than the actuator 230 to the force. Thus, the actuator latch 280 firmly holds the actuator 230 so that the actuator 230 does not escape from the parking zone 221.

However, when the hard disk drive 200 receives a relatively strong counterclockwise rotation impact, the actuator 230, receiving a clockwise rotational inertial force, does not escape from the parking zone 221. Nevertheless, the actuator 230, receiving a counterclockwise rotational force by a repulsive force between the actuator 230 and a stopper 275 installed to limit a range of movement of the actuator 230, may escape from the parking zone 221. Here, since the actuator latch 280 does not firmly hold the actuator 230, the magnetic head 231 of the actuator 230 intrudes the data zone 222, making contact therewith instead of flying over the hard disk 220, so that the surface of the hard disk 220 is physically damaged and, accordingly, data thereon is also damaged.

SUMMARY OF THE INVENTION

Accordingly, it is an object of the present invention to provide an actuator latch for a hard disk drive having an improved structure so that the actuator is prevented from escaping from the parking zone regardless of the direction of a rotational impact applied externally.

Additional objects and advantages of the invention will be set forth in part in the description which follows and, in part, will be obvious from the description, or may be learned by practice of the invention.

The foregoing and other objects of the present invention are achieved by providing an actuator latch for a hard disk drive that locks an actuator so that it does not pivot when a magnetic head installed at the actuator is positioned in a parking zone of a hard disk, the actuator latch comprising a hooked portion provided at one side of the actuator and having first and second hook steps disposed to face each other, a locking member having a hook portion which is coupled to the hooked portion as the actuator moves to the parking zone, the hook portion coupled to the hooked portion being interfered with the first hook step when the actuator rotates clockwise and with the second hook step when the actuator rotates counterclockwise, and an elastic member elastically supporting the locking member to be capable of rotating and providing a restoring force to the locking member with respect to both clockwise and counterclockwise rotations of the locking member.

The above and other objects of the present invention may also be achieved by providing an actuator latch for a hard disk drive that locks an actuator so that it does not pivot when a magnetic head installed at the actuator is positioned in a parking zone of a hard disk, the actuator latch comprising a hook portion provided at one side of the actuator and having first and second hook portions, a locking member having a hooked portion which is coupled to the hook portion as the actuator moves to the parking zone, the hooked portion coupled to the hook portion being interfered with the first hook portion when the actuator rotate clockwise and with the second hook step when the actuator rotates counterclockwise, and an elastic member elastically supporting the locking member to be capable of rotating and proving a restoring force to the locking member with respect to both clockwise and counterclockwise rotations of the locking member.

BRIEF DESCRIPTION OF THE DRAWINGS

These and other objects and advantages of the present invention will become more apparent and more readily appreciated from the following description of the embodiments, taken in conjunction with the accompany drawings in which.

DETAILED DESCRIPTION OF THE PREFERRED EMBODIMENTS

Figure 1:
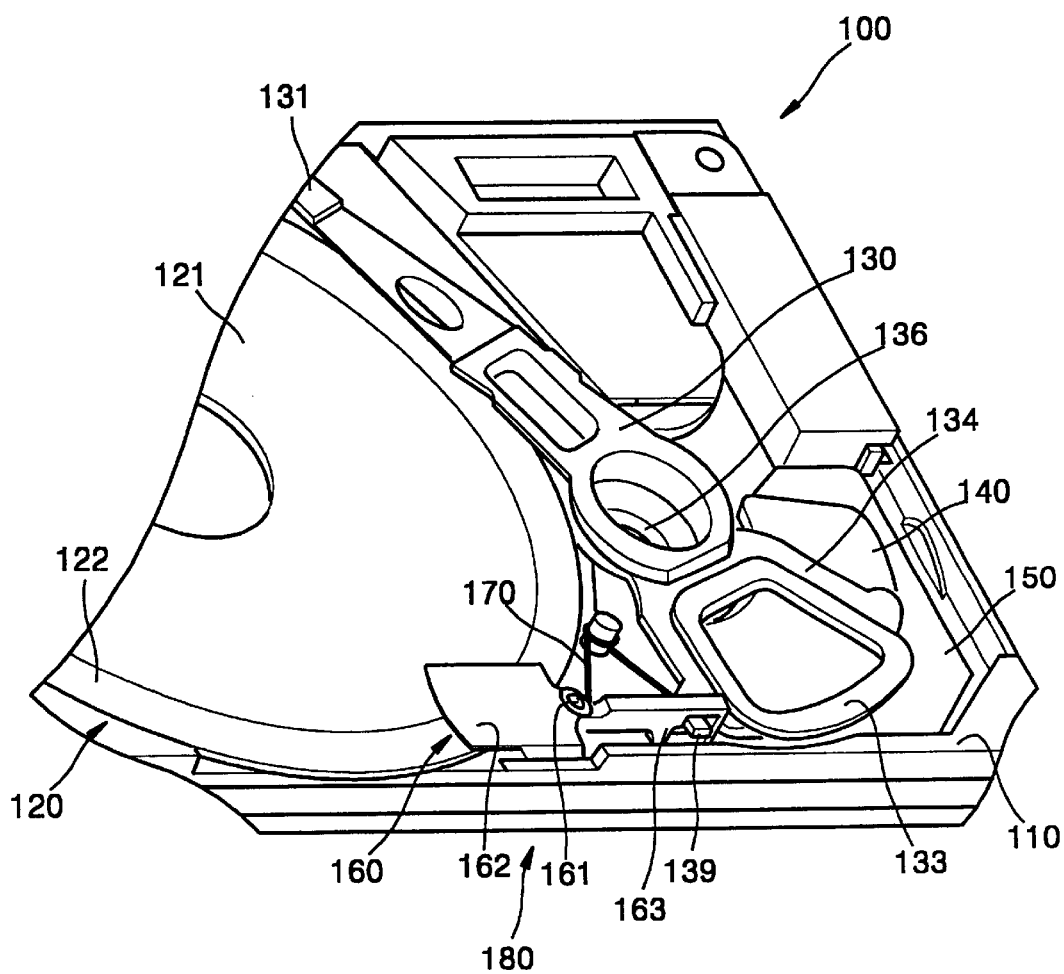
FIG. 1 is a perspective view showing the conventional actuator latch for a hard disk drive.
Figure 2:
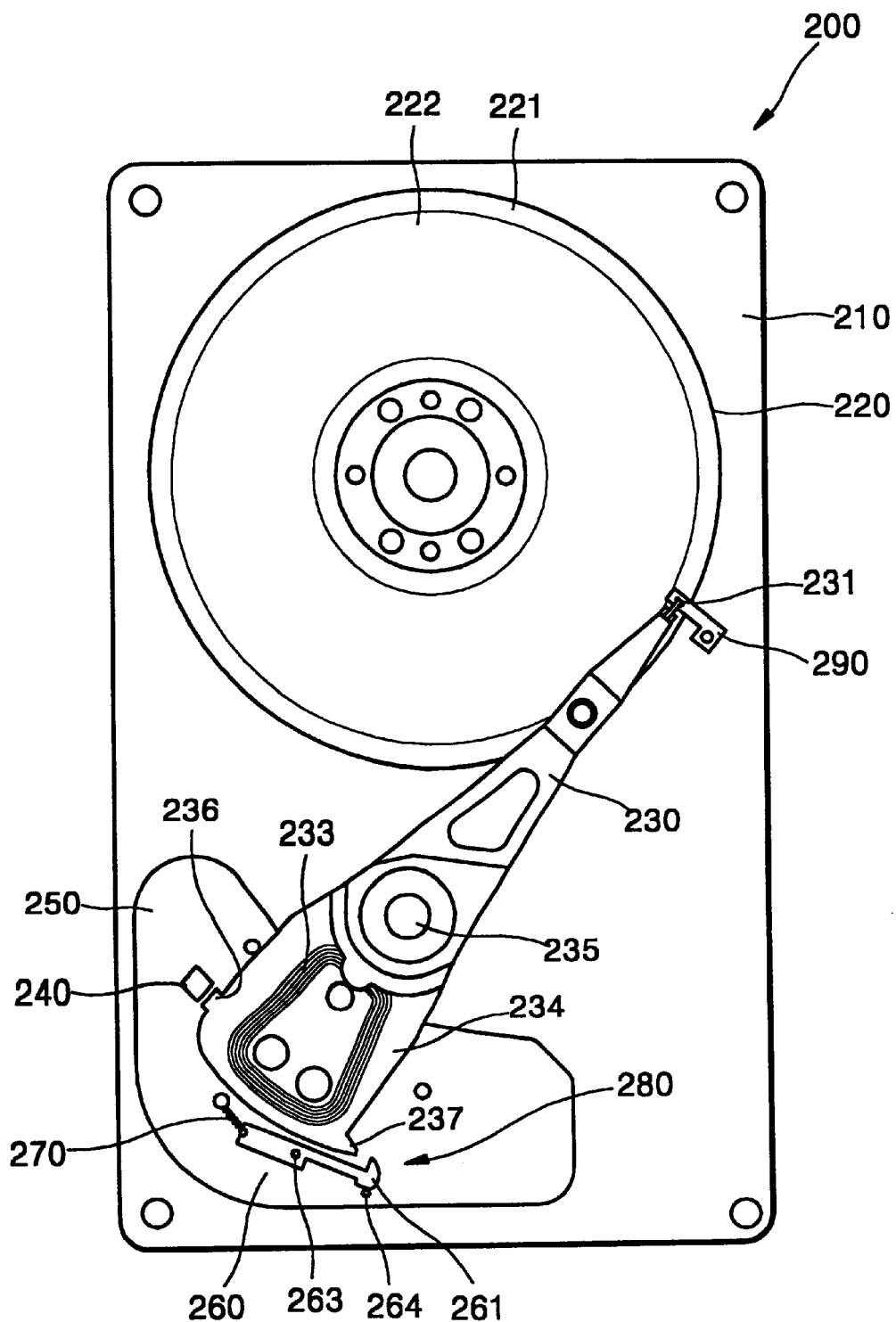
FIG. 2 is a plan view showing another conventional actuator latch for a hard disk drive.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3:
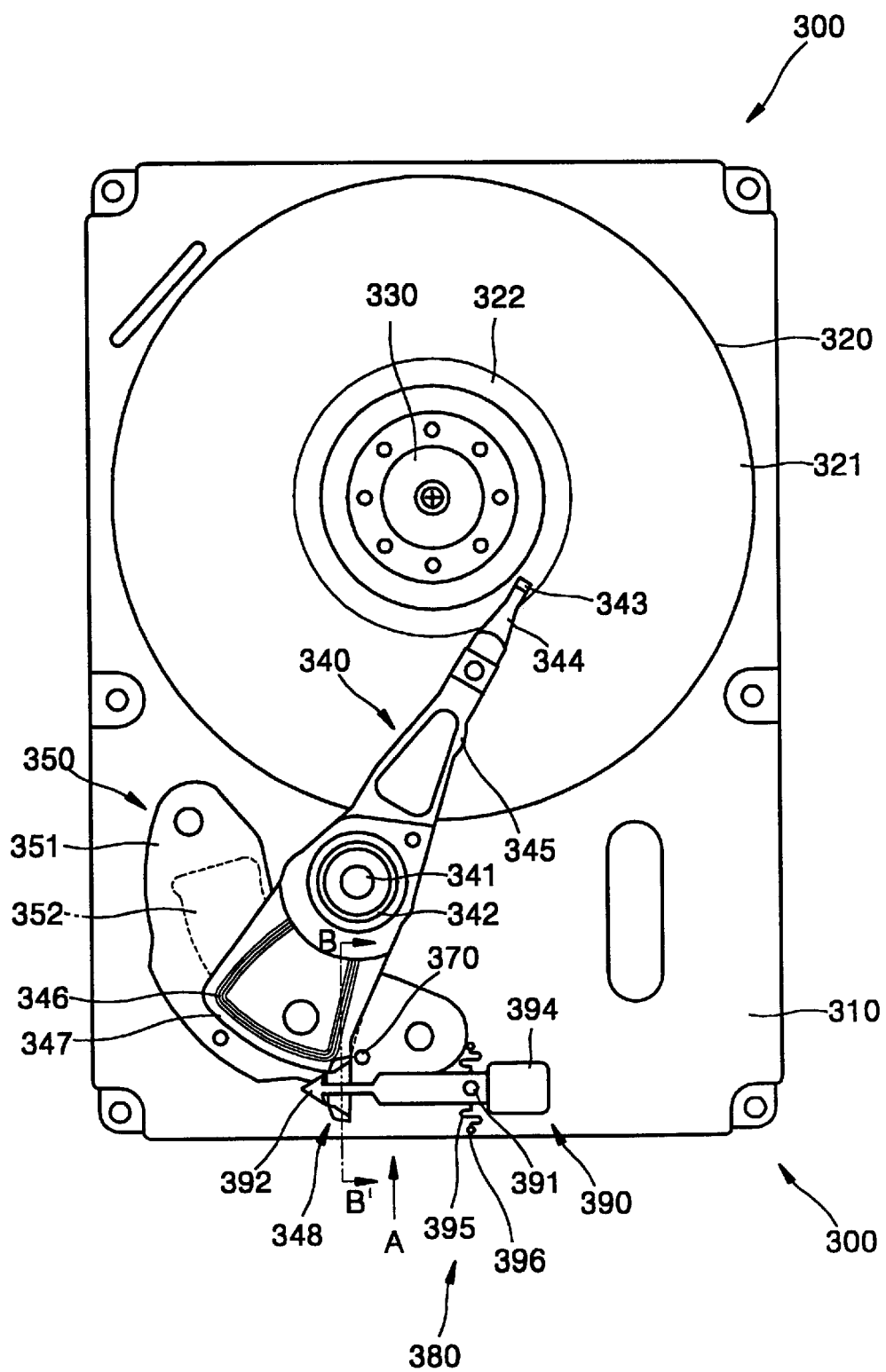
FIG. 3 is a plan view showing a hard disk drive adopting an actuator latch according to an embodiment of the present invention.
Figure 5A:
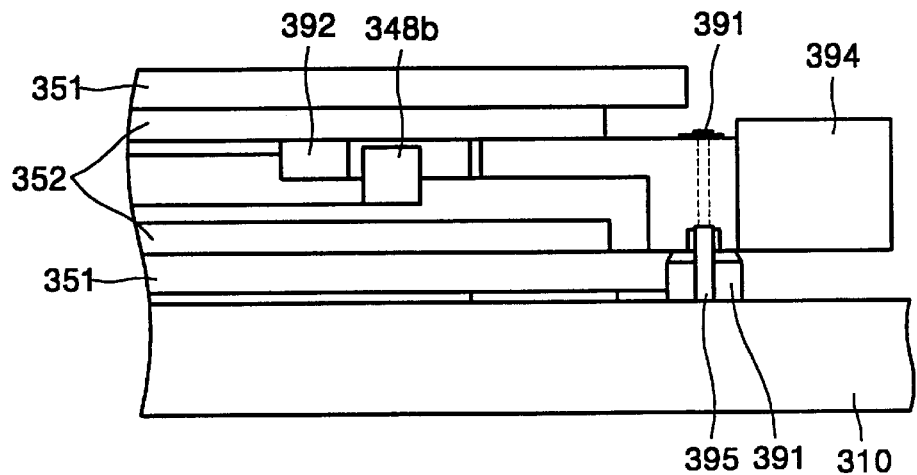
FIG. 5A is a side view showing the hard disk drive, viewed in a direction A shown in FIG. 3.
Figure 5B:
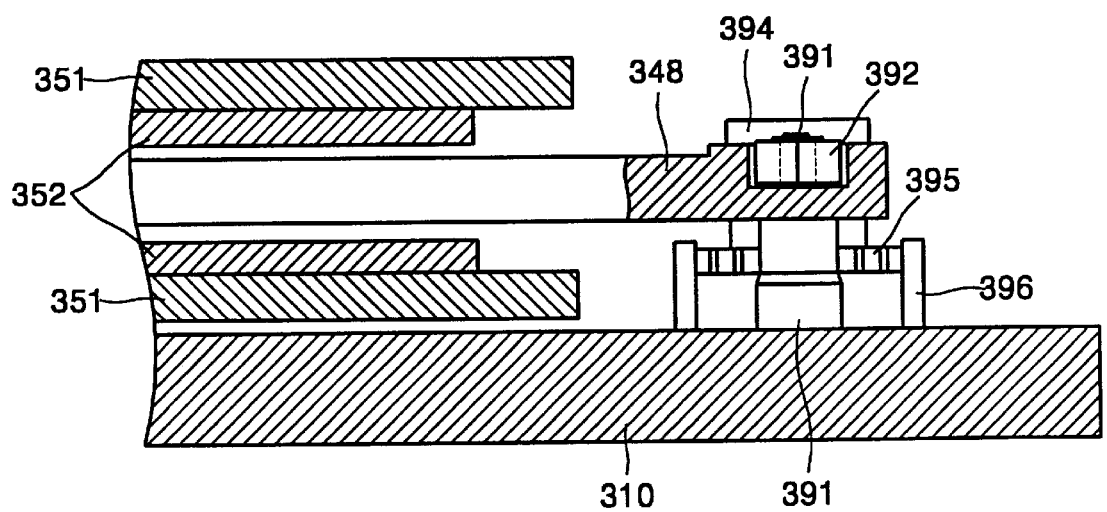
FIG. 5B is a sectional view taken along line B—B' in FIG. 3.

In FIG. 3, a stator 352 and a yoke 351 are omitted for the convenience of explanation. FIGS. 5A and 5B show a state in which the stator 352 and the yoke 351 are installed. Referring to FIG. 3, a hard disk drive 300 includes a base 310, a hard disk 320 installed to be capable of being rotated by a spindle motor 330 installed on the base, the hard disk 320 being divided into a data zone 321 to record or store data and a parking zone 322 where no data is recorded . Also included is an actuator 340 rotatably installed with respect to a pivot shaft 341 installed at the base 310 and having a magnet head 343 provided thereon to read or record data while moving over the hard disk 320. A stator portion 350 generates a magnetic force so that the actuator 340 can move over the hard disk 320, while a stopper 370 limits a range of pivot of the actuator 340, and a latch 380 prevents the actuator 340 from rotating and escaping from the parking zone 322 when the actuator 340 is in the parking zone, and an external rotational impact is applied to the hard disk drive 300.

The actuator 340 includes a suspension portion 344 supporting the magnet head 343, a swing arm 345 rotatably coupled to the pivot shaft 341 provided at the base 310 by interposing a pivot bearing 342, and a bobbin portion 347 around which a coil 346 generating an electromagnetic force is wound.

The stator portion 350 includes a stator 352 generating a magnetic field and a yoke 351 forming a magnetic path. The stator portion 350 enables the actuator 340 to move across the hard disk 320 by interacting with the bobbin portion 347.

Figure 4:
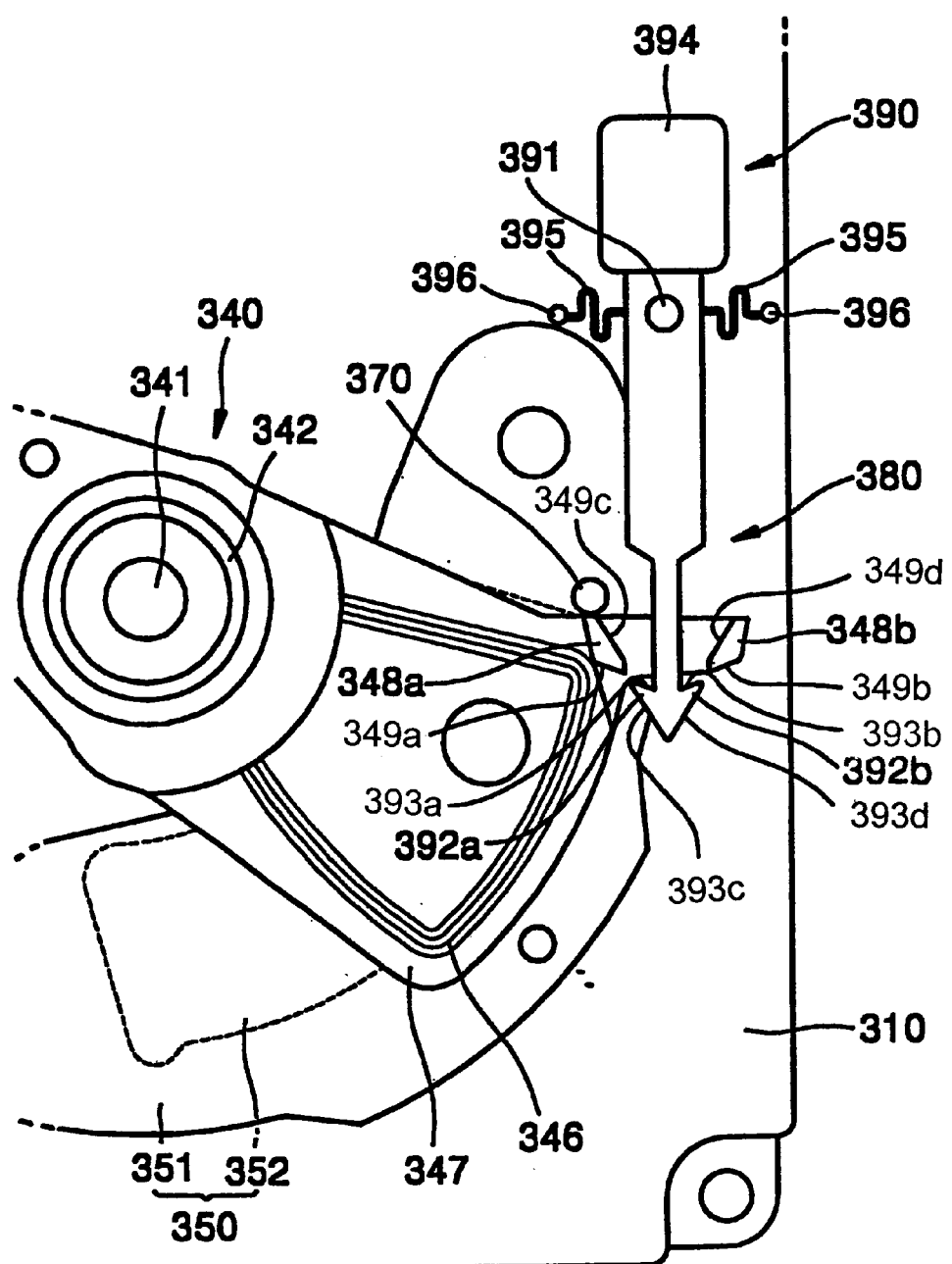
FIG. 4 is an enlarged view showing the actuator latch of FIG. 3

Referring to FIGS. 4, 5A and 5B, the latch 380 includes a hooked portion 348 provided at one end of the actuator 340 and having a plurality of hook steps 348a and 348b formed to face each other with a predetermined interval, and a locking member 390 installed to be capable of pivoting with respect to a rotation shaft 391 installed at the base 310. The locking member 390 includes a hook portion 392 provided at one end thereof to restrict rotation of the actuator 340 by selectively being coupled to the hook steps 348a and 348b, and a balancing portion 394 having a predetermined weight at the other end thereof to maintain balance by the inertia of the weight.

The hook portion 392 has a first hook portion 392a and a second hook portion 392b formed to be symmetric. Each of the first and second hook portions 392a and 392b has a first inclined portion 393a, 393b and a second inclined portion 393c, 393d. The hooked portion 348 has the first hook step 348a and the second hook step 348b to be coupled to the first hook portion 392a and the second hook portion 392b, respectively. Each of the first and second hook steps 348a and 348b has a third inclined portion 349a, 349b and a fourth inclined portion 349c, 349d corresponding to the first inclined portion 393a, 393b and the second inclined portion 393c, 393d. Here, the first inclined portion 393a, 393b and the third inclined portion 349a, 349b are inclined at the same angle while the second inclined portion 393c, 393d and the fourth inclined portion 349c, 349d are inclined at the same angle.

Thus, when the first hook portion 392a is coupled to the first hook step 348a, the first inclined portion 393a may interfere with the third inclined portion 349a so that the actuator 340 is prevented from rotating. Also, when the second hook portion 392b is coupled to the second hook step 348b, the first inclined portion 393b may interfere with the third inclined portion 349b so that the actuator 340 is prevented from rotating.

Here, the hook portion 392 is selectively coupled to the first or second hook steps 348a or 348b based on the direction of an external rotational impact.

When the actuator 340 is moved to the parking zone 322 from the data zone 321, the second inclined portion 393c, 393d and the fourth inclined portion 349c, 349d interfere with each other so that the actuator 340 can be stably accommodated in the parking zone 322. That is, even when the actuator 340, while moving toward the parking zone 322 is prevented by an external factor. Since the second inclined portion 393c, 393d contacts the fourth inclined portion 349c, 349d, the actuator 340 is guided to the parking zone 322 so that a mechanical malfunction does not occur.

Also, the interval between the first hook step 348a and the second hook step 348b is preferably set such that the hook portion 392 can be inserted therebetween without being caught by the first or second hook step 348a or 348b.

In the above structure, the hooked portion 348 can be easily manufactured by plastic injection molding, thus keeping the cost of manufacturing low. Also the shape of the hooked portion 348 can be varied according to the shape of a section thereof. That is, if the sectional shape of the hooked portion 348 is modified to, for example, a diamond shape, the same operation can be obtained.

The balancing portion 394 allows the locking member 390 to be in a balanced state, that is, to maintain a state in which the hook portion 392 is positioned in the middle of the first hook step 348a and the second hook step 348b. When a linear impact acts by using weight inertia of the balancing portion 394, the impact is absorbed by the weight inertia of balancing portion 394 so that the locking member 390 does not rotate, and therefore maintains a balanced state. In particular, when the locking member 390 is positioned to be perpendicular to the direction of gravity, the locking member 390 does not rotate with respect to one end or the other, but instead maintains a balanced state.

One end of an elastic member 395 is connected to the locking member 390 and the other end thereof is connected to the fixed member 396 installed at the base 310.

Although a coil spring is used as the elastic member 395 in the present embodiment, anything that has the same function can be used as the elastic member 395. For example, a torsion spring or a magnet-steel ball spring can be used as an alternative.

Figure 6:
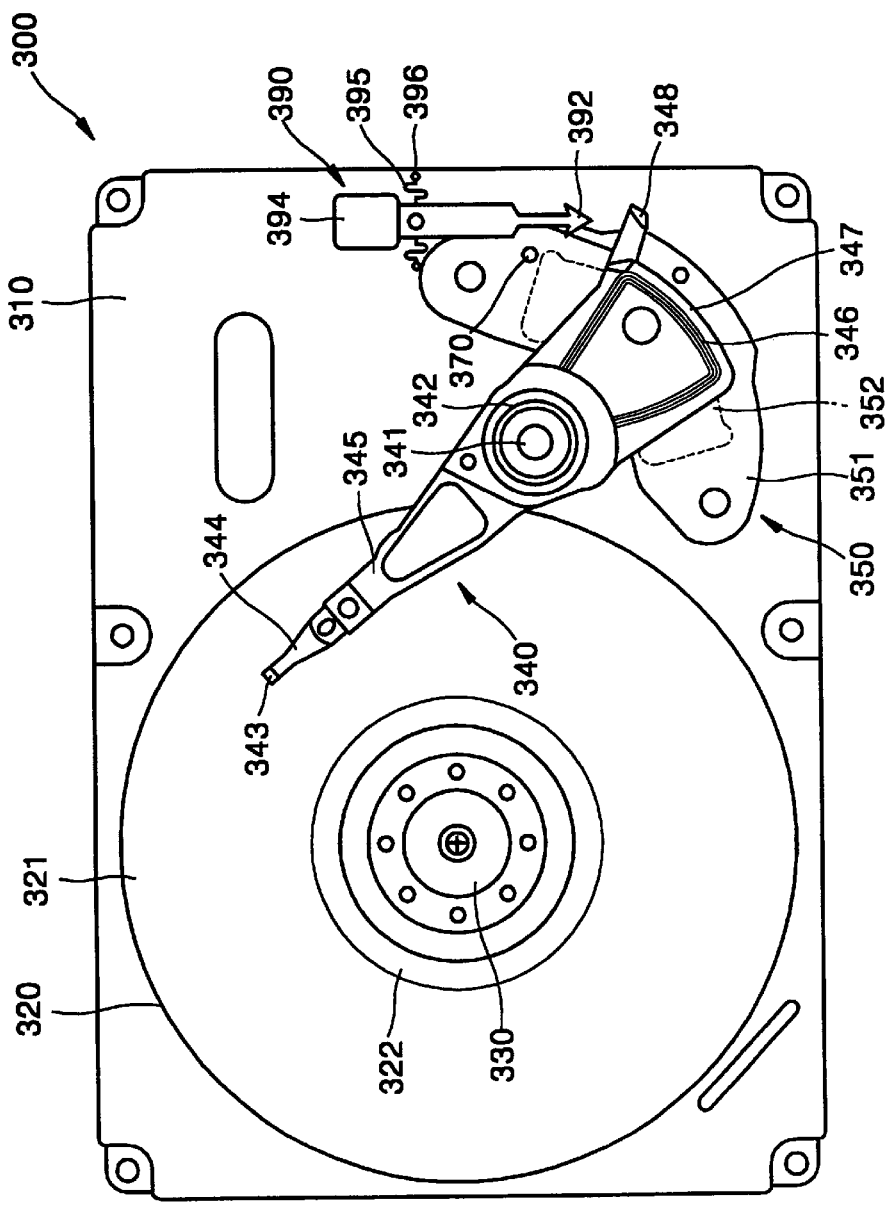
FIG. 6 is a plan view showing the actuator latch according to an embodiment of the present invention when no rotational impact is applied to the hard disk drive.

In the operation of the latch for a hard disk drive having the above structure according to an embodiment of the present invention, referring to FIG. 6, the actuator 340 is positioned in the data zone 321, thus positioned out of the parking zone 322. That is, the locking member 390 is not engaged with the hooked portion 348, and the actuator 340 is therefore not restricted. Thus, while the actuator 340 moves over the hard disk 320 by an electromagnetic force generated between the bobbin portion 347, the stator 352, and the yoke 351, the magnetic head 343 reads or records data.

Figure 7:
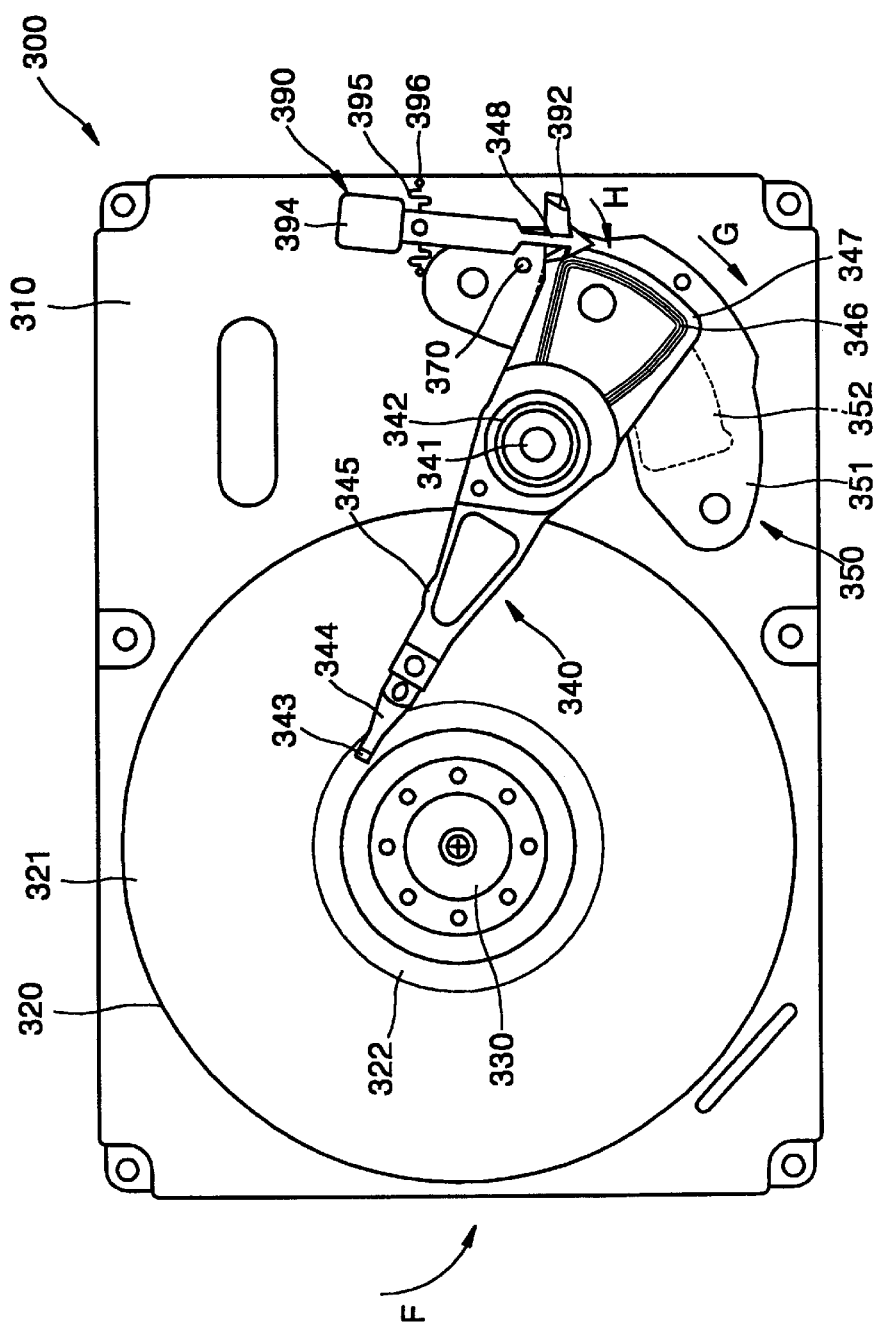
FIG. 7 is a plan view showing the actuator latch according to an embodiment of the present invention when a counterclockwise rotational impact is applied to the hard disk drive.

Referring to FIG. 7, the first inclined portion 393a of the second hook portion 392b is engaged with the third inclined portion 349a of the second hook step 348b so that the actuator 340 is prevented from further rotating.

Figure 8:
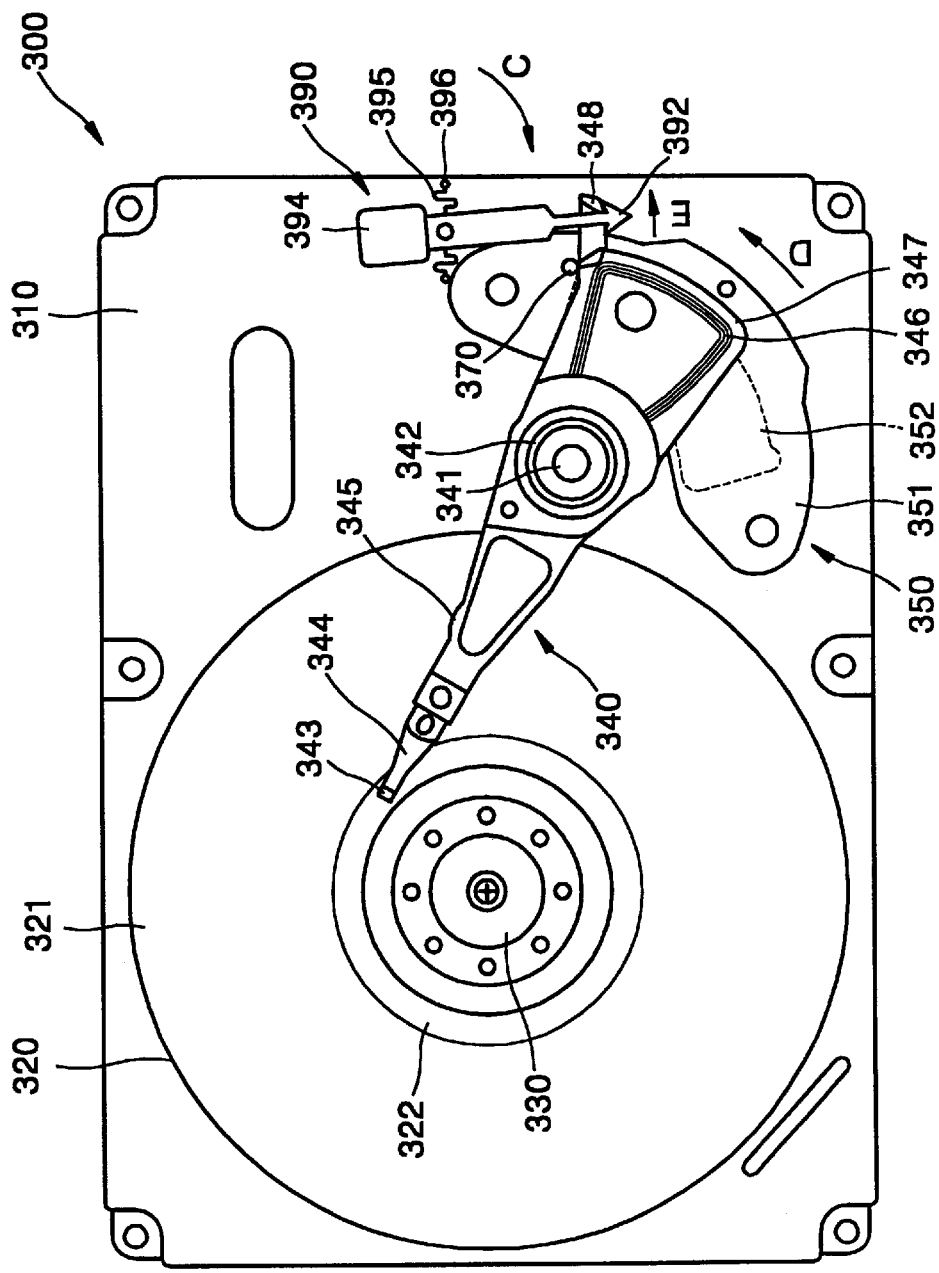
FIG. 8 is a plan view showing the actuator latch according to an embodiment of the present invention when a clockwise rotational impact is applied to the hard disk drive.

Referring to FIG. 8, the first inclined portion 393b of the second hook portion 392b is engaged with the third inclined portion 349b of the second hook step 348b so that the actuator 340 is prevented from further rotating.

When the rotational impact applied to the hard disk drive 300 disappears, the elastic member 395 returns the locking member 390 to its original position, that is, in a state in which the rotational impact is not applied, by using elastic energy stored as the locking member 390 rotates. Thus, the actuator 340 is released from a state of being firmly held by the locking member 390. The locking member 390 normally maintains a balanced position by the balancing portion 394.

Figure 9:
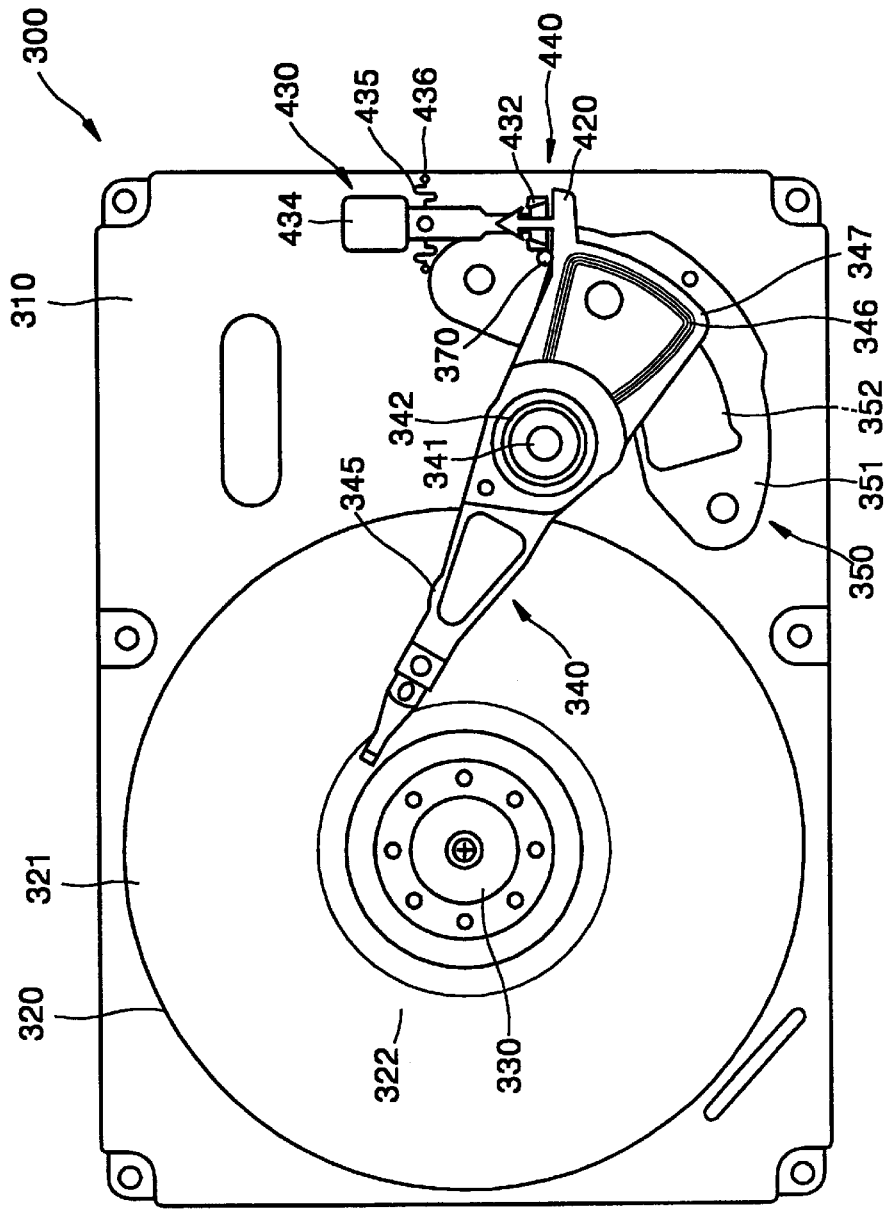
FIG. 9 is a plan view showing an actuator latch according to another embodiment of the present invention.
Figure 10:
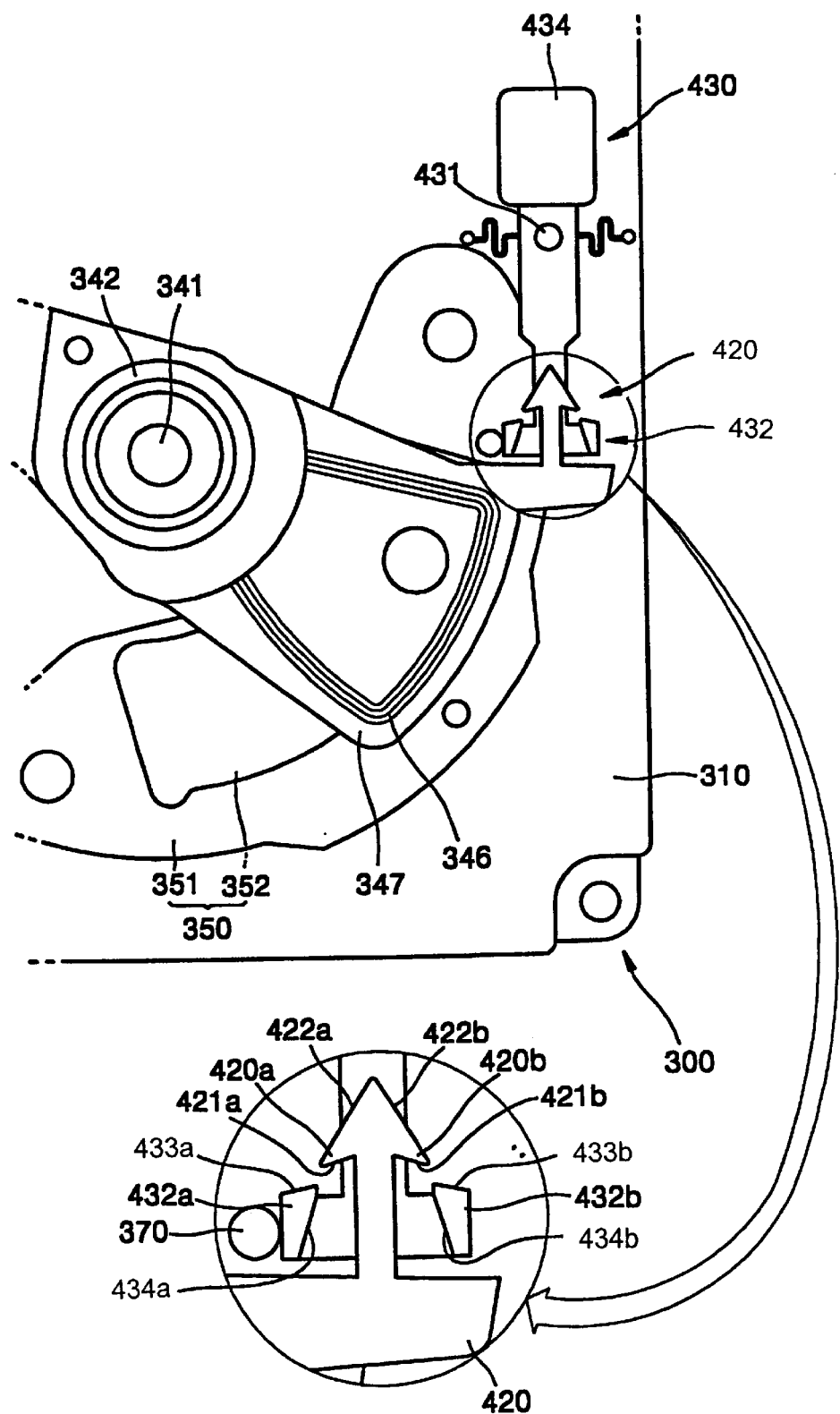
FIG. 10 is an enlarged view showing the actuator latch of FIG. 9.

Referring to FIGS. 9 and 10, the overall structure of the hard disk drive is the same as that shown in FIG. 3, except for the structures of a hook portion 420 and a hooked portion 432, which are opposite to those in the above-described embodiment. Here, the same reference numerals indicate the same elements having the same functions. Additionally, a locking member 430, a pivot shaft 431, a balancing portion 434, an elastic member 435, and a fixed member 436 of a latch 440, function substantially the same as the locking member 390, the pivot shaft 391, the balancing portion 394, the elastic member 395, and the fixed member 396 of the latch 380, and further description will be omitted.

Each of the first and second hook portions 420a and 420b includes a fifth inclined portion 421a, 421b and a sixth inclined portion 422a, 422b.

Each of the first and second hook steps 432a and 432b includes a seventh inclined portion 433a, 433b and an eighth inclined portion 434a, 434b.

That is, the fifth inclined portion 421a, 421b is coupled to the seventh inclined portion 433a, 433b, respectively, so that the actuator 340 is prevented from rotating.

As described above, in the actuator latch for a hard disk drive according to the present invention, when a clockwise or counterclockwise rotational impact is applied to the hard disk drive, since the actuator latch prevents the actuator from rotating, the actuator cannot escape from the parking zone. Therefore, the data zone of the hard disk drive can be protected from a damage generated by the actuator due to an external rotational impact.

Although preferred embodiments of the present invention have been shown and described, it will be appreciated by those skilled in the art that changes may be made in these embodiments without department from the principle and spirit of the invention, the scope of which is defined in the appended claims and their equivalents.

What is claimed is:

1. An actuator latch used with a hard disk drive to lock an actuator in a non-pivoting position when a magnetic head installed on the actuator is positioned in a parking zone of a hard disk, the actuator latch comprising:

a hooked portion provided at one side of the actuator and having first and second hook steps disposed to face each other;

a locking member having a hook portion approaching the hooked portion as the actuator moves to the parking zone, the hook portion approaching the hooked portion and contacting the first hook step in response to the actuator rotating clockwise and contacting the second hook step in response to the actuator rotating counterclockwise; and an elastic member elastically supporting the locking member to be capable of rotating and providing a restoring force to the locking member with respect to both clockwise and counterclockwise rotations of the locking member.

2. The actuator latch as claimed in claim 1, wherein the hook portion includes a first inclined portion and a second inclined portion and the hooked portion includes a third inclined portion and a fourth inclined portion corresponding to the hook portion, the first inclined portion coupling the third inclined portion when the actuator rotates clockwise or counterclockwise in the parking zone, and the second inclined portion coupling the fourth inclined portion when the actuator moves into the data zone.

3. The actuator latch as claimed in claim 1, wherein the locking member further comprises a balancing portion preventing the locking member from rotating clockwise or counterclockwise with respect to a linear impact applied to the hard disk drive by using inertia of a predetermined weight.

4. The actuator latch as claimed in claim 1, further comprising: a stopper stopping said actuator after reaching the parking zone.

5. The actuator latch as claimed in claim 1, wherein an interval between the first and second hook steps is large enough to enable the hook portion to be inserted therebetween.

6. The actuator latch as claimed in claim 1, wherein the hooked portion is plastic injection molded.

7. The actuator latch as claimed in claim 1, wherein the locking member has an arrow shape.

8. The actuator latch as claimed in claim 1, wherein the hooked portion has a diamond shape.

9. The actuator latch as claimed in claim 1, wherein the hooked portion is formed integrally with the actuator.

10. An actuator latch used with a hard disk drive to lock an actuator in a non-pivoting position when a magnetic head installed on the actuator is positioned in a parking zone of a hard disk, the actuator latch comprising:

a hook portion provided at one side of the actuator;

a locking member having a hooked portion with first and second hook steps disposed to face each other, approaching the hook portion, and the hook portion passing between the first and second hook steps as the actuator moves to the parking zone, the hooked portion approaching the hook portion and the first hook step contacting the hook portion in response to the actuator rotating clockwise, and the second hook step contacting the hook portion in response to the actuator rotating counterclockwise; and an elastic member elastically supporting the locking member to be capable of rotating and providing a restoring force to the locking member with respect to both clockwise and counterclockwise rotations of the locking member.

11. The actuator latch as claimed in claim 10, wherein the hook portion includes a first inclined portion and a second inclined portion and the hooked portion includes a third inclined portion and a fourth inclined portion corresponding to the hook portion, the first inclined portion and contacting the third inclined portion in response to the actuator rotating clockwise or counterclockwise in the parking zone, and the second inclined portion contacting the fourth inclined portion in response to the actuator moving in a data zone.

12. The actuator latch as claimed in claim 10, wherein the locking member further comprises a balancing portion preventing the locking member from rotating clockwise or counterclockwise with respect to a linear impact applied to the hard disk drive by using inertia of a predetermined weight.

13. The actuator latch as claimed in claim 10, wherein an interval between the first and second hook portions is large enough to enable the hooked portion to be inserted therebetween.

14. The actuator latch as claimed in claim 10, wherein the hook portion has an arrow shape.

15. The actuator latch as claimed in claim 10, wherein the hooked portion has a diamond shape.

16. The actuator latch as claimed in claim 10, wherein the hook portion is formed integrally with the actuator.

17. An actuator latch used with a hard disk drive accommodating a hard disk having a parking zone and a data zone, wherein an actuator moves between the parking zone and the data zone, the actuator latch comprising:

first and second protrusions spaced apart from each by an interval;

a locking member passing between the first and second protrusions when the actuator enters the parking zone, yet remaining disengaged from the first and second protrusions while the actuator is in the parking zone and no external force is applied to the actuator, and respectively engaging the first and second protrusions based upon the external force being applied in a clockwise and a counterclockwise direction to the actuator while the actuator is in the parking zone, to maintain the actuator in the parking zone.

18. The actuator latch as claimed in claim 17, further comprising:

a hooked portion comprising the first and second protrusions, wherein the hooked portion is formed integrally with the actuator.

19. The actuator latch as claimed in claim 18, further comprising a biasing device to bias the locking member to be spaced apart from both the first and second protrusions while the actuator is in the parking zone.

20. The actuator latch as claimed in claim 17, wherein the locking member is integrally formed with the actuator.

21. The actuator latch as claimed in claim 20, further comprising a biasing device to bias the first and second protrusions so that the locking member is spaced apart from both the first and second protrusions while the actuator is in the parking zone.

22. An actuator latch used with a hard disk drive to lock an actuator in a non-pivoting position when in a non-used position, the actuator latch comprising:

a fastened unit at one end of the actuator;

a locking member having a fastening unit approaching the fastened unit as the actuator moves toward the non-used position, the fastening unit approaching the fastened unit and contacting the fastened unit when the actuator rotates clockwise or counterclockwise; and an elastic member supporting the locking member rotatably and providing a restoring force to the locking member with respect to both the clockwise and counterclockwise rotations of the locking members, wherein one of the fastened unit and the fastening unit passes between sides of the remaining one of the fastened unit and the fastening unit as the actuator moves toward the non-used position.

23. An actuator latch for a hard disk drive, comprising:

a locking member to lock an actuator;

a hooked portion having opposing first and second projections, positioned on one of the actuator and the locking member;

a hook portion, positioned on the remaining one of the actuator and the locking member,
passing between the first and second projections as the actuator enters a parking zone, and
in response to one of a clockwise and a counterclockwise acceleration of predetermined magnitude of the actuator, engaging one of the first and second projections to maintain the actuator in the parking zone.

* * * * *

UNITED STATES PATENT AND TRADEMARK OFFICE
CERTIFICATE OF CORRECTION

PATENT NO. : 6,728,075 B2
DATED : April 27, 2004
INVENTOR(S) : Min-pyo Hong et al.

It is certified that error appears in the above-identified patent and that said Letters Patent is hereby corrected as shown below:

<u>Title page,</u>
Item [57], ABSTRACT,
Lines 10 and 12, change "rotate" to -- rotates --.

<u>Column 8,</u>
Lines 14, begin a new paragraph with "a stopper".

<u>Column 10,</u>
Line 13, change "members" to -- member --.

Signed and Sealed this

Twenty-fourth Day of August, 2004

JON W. DUDAS
*Director of the United States Patent and Trademark Office*